Figure 1:
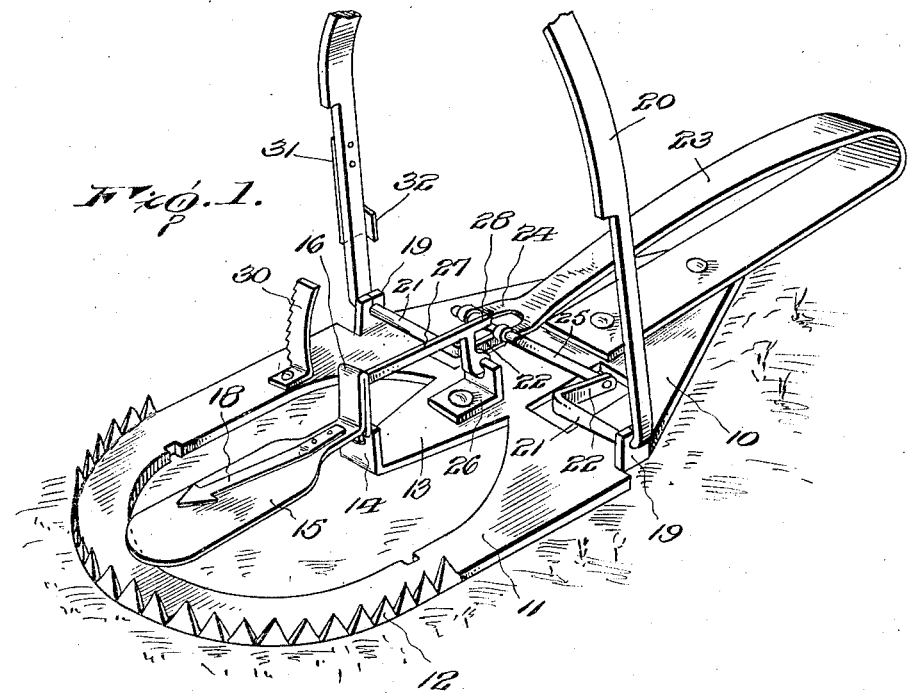

J. J. McQUAID.
ANIMAL TRAP.
APPLICATION FILED JUNE 14, 1919.

1,362,168.

Patented Dec. 14, 1920.

Inventor:
J. J. McQuaid.
by Lacey & Lacey,
Attorneys.

UNITED STATES PATENT OFFICE.

JOHN J. McQUAID, OF SHINNSTON, WEST VIRGINIA.

ANIMAL-TRAP.

1,362,168.     Specification of Letters Patent.     Patented Dec. 14, 1920.

Application filed June 14, 1919. Serial No. 304,231.

*To all whom it may concern:*

Be it known that I, JOHN J. MCQUAID, a citizen of the United States, residing at Shinnston, in the county of Harrison and State of West Virginia, have invented certain new and useful Improvements in Animal-Traps, of which the following is a specification.

This invention relates to an improved animal trap and has as one of its principal objects to provide a simple and efficient device of this character which may be easily sprung and which will effectually hold an animal caught therein.

The invention has as a further object to provide a trap wherein the swinging spring actuated jaw of the trap will, when released, be automatically locked closed coacting with the fixed jaw of the trap, so that an animal caught in the trap will be prevented from spreading the jaws and getting loose.

And the invention has as a still further object to provide a trap which may be employed for catching large animals as well as small animals so that the trap will thus be adapted for a wide range of use.

Figure 2:
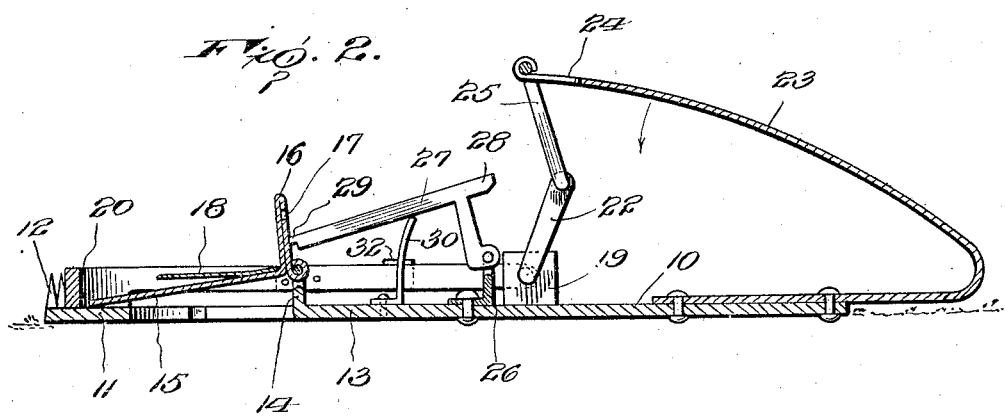
Figure 3:
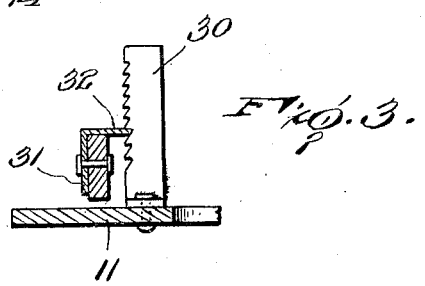

Other and incidental objects will appear hereinafter. In the drawings:

Figure 1 is a perspective view of my improved trap, this view showing the trap set, Fig. 2 is a longitudinal sectional view taken medially through the trap and showing the trap sprung, and Fig. 3 is a fragmentary sectional view more particularly illustrating the means employed for automatically locking the swinging jaw of the trap.

In carrying the invention into effect, I employ a trap body 10. This trap body is preferably formed from a piece of suitable resilient sheet metal and is cut away at its forward end to provide a fixed jaw 11 around the forward end of which is arranged a series of teeth 12 upstanding from the outer edge of the jaw. Projecting forwardly within the jaw at the inner end thereof is an arm 13 integral with the trap body and this arm is, at its forward end, provided with an upstanding lug 14. Pivoted upon this lug is a trip 15 which extends forwardly within the jaw and, as particularly shown in Fig. 2, is adapted to rest thereon. The trip is preferably formed from a piece of suitable resilient sheet metal and is provided with a relatively wide outer end portion while the inner end portion thereof is reduced and, adjacent the inner end of the trip is rebent upwardly upon itself to form an upstanding keeper 16. Adjacent the upper end of the keeper, the rear overlapping portion thereof is provided with a centrally located opening 17. Mounted upon the trip to extend forwardly and upwardly over the wide outer end portion thereof is a resilient bait holding prong 18 which is preferably headed.

Formed in the trap body at opposite sides thereof are upstanding lugs 19 arranged at the inner end of the fixed jaw and swingingly mounted upon these lugs is a swinging jaw 20. The bow of this jaw is preferably widened so that said bow will accordingly be increased in weight to in turn enhance the striking force of the jaw. At their inner ends the sides of the jaw are reduced and are bent to provide inwardly directed arms or trunnions 21 which are journaled through the lugs 19 for pivotally supporting the jaw and, in turn, are bent at their inner ends to form oppositely disposed cranks 22. Secured at one end to the rear end portion of the trap body 10 is a medially arranged spring which is flat and is rebent upon itself to provide a forwardly projecting spring arm 23 extending in a plane between the cranks 22. The spring arm is preferably tapered somewhat and, at its forward terminal is provided with a fork 24. Swingingly mounted upon the arms of this fork is a substantially U-shaped yoke 25, the parallel arms of which are, at their lower ends, provided with lateral outwardly directed trunnions journaled through the upper free ends of the cranks 22. The arm is thus operatively connected with the swinging jaw and, as will be clear, will act through the yoke upon said cranks for forcibly moving the jaw into coacting relation with the fixed jaw. Secured upon the arm 13 of the fixed jaw is an angle plate 26 upon the upstanding flange of which is pivoted an angular shaped detent 27. This detent is formed with a long arm and a short arm at substantially right angles to the long arm, the latter arm being provided at its lower end with a laterally and rearwardly directed ear coacting with the plate for pivotally supporting the detent. At its rear end the long arm provides a lug 28 projecting in the rear of the short arm of the detent while at its forward end the long arm is cut away to provide a reduced pin or lug 29 engageable in the opening 17 of the keeper 16.

It is now to be observed that when the switching jaw 20 is closed so as to rest upon the fixed jaw, as shown in Fig. 2, the cranks 22 of the swinging jaw will occupy a position inclining upwardly and rearwardly so that the free ends of said crank will be located in a plane behind the forward end of the spring arm 23. Consequently, the yoke 25 will normally assume a position inclining rearwardly beneath the free end of said arm so that by simply depressing this arm, the swinging jaw may be swung upwardly for setting the trap. In this connection it should be observed that the trap body is provided with spaced openings to accommodate the cranks 22 when said cranks are swung downwardly. To set the trap, the swinging jaw is moved upwardly until the connecting portion or bight of the yoke 25 has been depressed to a point where the lug 28 of the detent 27 may be engaged thereover. The detent is then swung rearwardly to engage said lug over the yoke when the trip 18 is lifted and the lug 29 of the detent engaged in the opening 17 of the keeper 16 of the trip. The trip will then hold the detent stationary so that the detent will, in turn, retain the spring arm 23 depressed so that the swinging jaw will be held open. However, as will be clear, an animal stepping upon or even lightly touching the trip will disengage the keeper thereof from the detent so that the detent will be released to immediately free the swinging jaw when said jaw will be forcibly swung into coacting relation with the fixed jaw. I accordingly provide a trap which may be easily sprung but which, under ordinary conditions, will remain set until positively released for making a possible catch. Furthermore, the trap is, as will be appreciated, of such nature that it may be advantageously located for effecting a catch and in order that the trap may be nailed to some convenient object or in like manner secured up in a tree, the fixed jaw is, as particularly shown in Fig. 1, preferably provided with notches in which the nails may be engaged.

In connection with the swinging jaw 20 I provide a locking device therefor designed to prevent movement of this jaw away from the fixed jaw by an animal caught in the trap. An upstanding post 30 is secured to the fixed jaw at one side thereof and this post is provided in its outer edge with a series of teeth. Secured at one end upon the adjacent arm of the movable jaw is a spring locking member 31 provided at its free end with a laterally and inwardly directed lug 32 projecting over the upper edge of said arm and, as particularly shown in Fig. 3, adapted to coöperate with the teeth of the post. Thus, when the swinging jaw is released, this lug will ride over the teeth of the post until the jaw is stopped in its closing movement, when the locking member will coact with the post for locking the jaw closed. Consequently, an animal caught between the jaws cannot pry the movable jaw away from the fixed jaw.

Having thus described the invention, what is claimed as new is:

1. An animal trap including a fixed jaw, a movable jaw mounted thereon to coact with the fixed jaw, an actuating spring for the movable jaw free at one end, means pivotally connecting the free end of said spring with the movable jaw, a detent mounted to coact with said means, and a trip arranged to coact with said detent for restraining the detent holding the movable jaw open.

2. An animal trap including a fixed jaw, a movable jaw swingingly mounted thereon to coact with the fixed jaw, an actuating spring for the movable jaw, a yoke pivotally connecting said spring with the movable jaw, a detent mounted to coact with said yoke, and a trip arranged to coact with said detent for restraining the detent holding the movable jaw open.

3. An animal trap including a fixed jaw, a movable jaw swingingly mounted thereon to coact with the fixed jaw and provided with a crank, an actuating spring for the movable jaw, means operatively connecting said spring with the movable jaw and engaged with said crank, a detent mounted to coact with said means, and a trip arranged to coact with said detent for restraining the detent holding the movable jaw open.

4. An animal trap including a fixed jaw, a movable jaw swingingly mounted thereon to coact with the fixed jaw and provided at its inner ends with cranks, an actuating spring for the movable jaw, a yoke connecting the spring with said cranks, a detent mounted to coact with said yoke, and a trip arranged to coact with said detent for restraining the detent holding the movable jaw open.

5. An animal trap including a fixed jaw, a movable jaw swingingly mounted thereon to coact with the fixed jaw, an actuating spring for the movable jaw, means operatively connecting said spring with the movable jaw, a pivoted detent engageable at its rear end with said means, and a pivoted trip engageable with the forward end of said detent for restraining the detent holding the movable jaw open.

6. An animal trap including a fixed jaw, a movable jaw swingingly mounted thereon to coact with the fixed jaw, an actuating spring for the movable jaw, means operatively connecting said spring with the movable jaw, a detent having angularly disposed arms pivoted by one of said arms and having one end of the other of its arms forming a lug engageable with said means, and a trip engageable with the opposite end of the latter arm of the detent for restraining the detent holding the movable jaw open.

7. An animal trap including a fixed jaw, a movable jaw mounted thereon to coact with the fixed jaw, an actuating spring for the movable jaw, means operatively connecting said spring with the movable jaw, a detent mounted to coact with said means, a trip arranged to coact with said detent for restraining the detent holding the movable jaw open, and means for automatically locking the movable jaw when released coacting with the fixed jaw.

8. An animal trap including a fixed jaw, a movable jaw mounted thereon to coact with the fixed jaw, an actuating spring for the movable jaw, means operatively connecting said spring with the movable jaw, a detent mounted to coact with said means, a trip arranged to coact with said detent for restraining the detent holding the movable jaw open, a post upstanding from the fixed jaw, and a spring locking member carried by the movable jaw and adapted to coact with said post for locking the movable jaw when released coacting with the fixed jaw.

9. An animal trap including a fixed jaw, a movable jaw having its end portions directed laterally to provide trunnions having cranks thereon, means engaged with said trunnions and pivotally supporting the movable jaw to coact with the fixed jaw, an actuating spring, a yoke forming an operative connection between the spring and said cranks, a detent mounted to coact with the yoke, and a trip arranged to coact with said detent for restraining the detent holding the movable jaw open.

In testimony whereof I affix my signature.

JOHN J. McQUAID. [L. S.]